United States Patent
Islam et al.

(10) Patent No.: US 12,471,077 B2
(45) Date of Patent: Nov. 11, 2025

(54) MEASUREMENT AND POWER CONTROL IN INTEGRATED ACCESS FRONTHAUL NETWORKS

(71) Applicant: QUALCOMM Incorporated, San Diego, CA (US)

(72) Inventors: Muhammad Nazmul Islam, Littleton, MA (US); Navid Abedini, Basking Ridge, NJ (US); Ashwin Sampath, Skillman, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 419 days.

(21) Appl. No.: 17/228,359

(22) Filed: Apr. 12, 2021

(65) Prior Publication Data
US 2022/0330250 A1    Oct. 13, 2022

(51) Int. Cl.
| | |
|---|---|
| *H04W 72/044* | (2023.01) |
| *H04W 24/10* | (2009.01) |
| *H04W 72/23* | (2023.01) |
| *H04W 72/53* | (2023.01) |

(52) U.S. Cl.
CPC ....... *H04W 72/0473* (2013.01); *H04W 24/10* (2013.01); *H04W 72/23* (2023.01); *H04W 72/53* (2023.01)

(58) Field of Classification Search
None
See application file for complete search history.

(56) References Cited

U.S. PATENT DOCUMENTS

| | | | | |
|---|---|---|---|---|
| 7,369,512 | B1 * | 5/2008 | Shurbanov | H04L 45/48 |
| | | | | 370/254 |
| 10,749,592 | B1 * | 8/2020 | Marupaduga | H04B 7/15542 |
| 2005/0043051 | A1 * | 2/2005 | Takano | H04W 52/286 |
| | | | | 455/522 |
| 2005/0058104 | A1 * | 3/2005 | Yomo | H04B 7/15528 |
| | | | | 370/335 |

(Continued)

FOREIGN PATENT DOCUMENTS

| | | | | |
|---|---|---|---|---|
| JP | 5658187 | * | 1/2015 | H04B 7/02 |
| JP | 5658187 B2 | * | 1/2015 | H04B 7/02 |

OTHER PUBLICATIONS

JP5658187 (Year: 2015).*

*Primary Examiner* — Christopher T Wyllie
(74) *Attorney, Agent, or Firm* — Paul M. McAdams; MG-IP Law, P.C.

(57) ABSTRACT

Disclosed are techniques for wireless communication. In an aspect, a base station may determine a transmit power to be used by a downstream node or an amplification gain to be used by the downstream node when relaying or repeating messages to a target node. The base station may transmit, to the downstream node, a message intended for the target node, the message having an indicated transmit power, wherein the message intended for the target node is transmitted by the base station using an actual transmit power. In some aspects, the indicated transmit power is the transmit power to be used by the downstream node, so that when the message intended for the target node is repeated by the downstream node, the indicated transmit power of the repeated message matches the actual transmit power of the repeated message.

12 Claims, 13 Drawing Sheets

(56) References Cited

U.S. PATENT DOCUMENTS

| | | | |
|---|---|---|---|
| 2006/0105705 A1* | 5/2006 | Maca | H04B 7/155 455/11.1 |
| 2007/0015462 A1* | 1/2007 | Dean | H04B 7/15557 455/15 |
| 2008/0304555 A1* | 12/2008 | Larsson | H04L 27/2601 375/211 |
| 2010/0041425 A1* | 2/2010 | Cesar | H04W 52/346 455/501 |
| 2010/0151793 A1* | 6/2010 | Wang | H04W 52/16 455/67.11 |
| 2010/0278169 A1* | 11/2010 | Wang | H04L 1/0041 370/345 |
| 2011/0019634 A1* | 1/2011 | Fujii | H04W 16/14 370/329 |
| 2011/0080865 A1* | 4/2011 | Tsai | H04B 7/1555 370/315 |
| 2012/0057619 A1* | 3/2012 | Shen | H04B 7/15535 375/211 |
| 2012/0083202 A1* | 4/2012 | Sawamoto | H04B 7/15535 455/7 |
| 2012/0182930 A1* | 7/2012 | Sawai | H04L 5/0051 370/315 |
| 2012/0294172 A1* | 11/2012 | Adachi | H04W 52/242 370/252 |
| 2012/0322362 A1* | 12/2012 | Coon | H04B 7/15557 455/9 |
| 2012/0327794 A1* | 12/2012 | Han | H04W 52/46 370/252 |
| 2013/0010635 A1* | 1/2013 | Seo | H04W 52/245 370/252 |
| 2013/0010673 A1* | 1/2013 | Lee | H04B 7/15542 370/315 |
| 2013/0034048 A1* | 2/2013 | Adachi | H04B 7/15592 370/315 |
| 2013/0072110 A1* | 3/2013 | Gunnarsson | H04W 72/0466 455/7 |
| 2013/0072112 A1* | 3/2013 | Gunnarsson | H04B 7/2606 455/7 |
| 2013/0176875 A1* | 7/2013 | Huang | H04B 7/15557 370/252 |
| 2013/0223330 A1* | 8/2013 | Medbo | H04B 7/155 370/315 |
| 2013/0225166 A1* | 8/2013 | Akhtar | H04W 60/00 455/435.1 |
| 2013/0315133 A1* | 11/2013 | Wang | H04W 40/12 370/315 |
| 2013/0322364 A1* | 12/2013 | Tsai | H04W 52/24 370/329 |
| 2013/0343261 A1* | 12/2013 | Gonsa | H04W 76/25 370/315 |
| 2014/0119332 A1* | 5/2014 | Kim | H04W 52/58 370/330 |
| 2014/0241237 A1* | 8/2014 | Speight | H04W 52/46 370/315 |
| 2014/0321345 A1* | 10/2014 | Li | H04W 52/143 370/311 |
| 2014/0328329 A1* | 11/2014 | Novlan | H04W 56/0015 370/336 |
| 2015/0117299 A1* | 4/2015 | Zhang | H04W 52/30 370/315 |
| 2015/0358198 A1* | 12/2015 | Mahajan | H04L 67/60 709/221 |
| 2016/0150576 A1* | 5/2016 | Moisio | H04W 4/023 370/329 |
| 2017/0208638 A1* | 7/2017 | Baghel | H04W 52/46 |
| 2017/0265187 A1* | 9/2017 | Chen | H04B 7/15507 |
| 2018/0098290 A1* | 4/2018 | Yu | H04W 52/241 |
| 2018/0310252 A1* | 10/2018 | Wu | H04B 7/0473 |
| 2019/0268234 A1* | 8/2019 | Cheng | H04L 41/0803 |
| 2020/0068510 A1* | 2/2020 | Martin | H04W 52/146 |
| 2020/0127732 A1* | 4/2020 | Krapp | H04B 10/038 |
| 2020/0134191 A1* | 4/2020 | Strein | G06F 21/562 |
| 2020/0136733 A1* | 4/2020 | Hassan Hussein | H04W 76/14 |
| 2020/0163028 A1* | 5/2020 | Chae | H04W 52/38 |
| 2020/0169956 A1* | 5/2020 | Sun | H04W 72/04 |
| 2020/0296680 A1* | 9/2020 | Akkarakaran | H04W 4/029 |
| 2021/0112479 A1* | 4/2021 | Abedini | H04W 40/22 |
| 2021/0126694 A1* | 4/2021 | Abedini | H04B 7/0408 |
| 2021/0127368 A1* | 4/2021 | Abedini | H04L 5/0053 |
| 2021/0194569 A1* | 6/2021 | Ray Chaudhuri | H04B 7/15507 |
| 2022/0046637 A1* | 2/2022 | Abedini | H04W 8/24 |
| 2022/0053433 A1* | 2/2022 | Abedini | H04L 5/0051 |
| 2022/0094503 A1* | 3/2022 | Elshafie | H04L 5/0055 |
| 2022/0311487 A1* | 9/2022 | Abedini | H04B 7/0617 |
| 2022/0321199 A1* | 10/2022 | Abedini | H04L 41/0813 |
| 2022/0330250 A1* | 10/2022 | Islam | H04W 72/0473 |
| 2024/0107571 A1* | 3/2024 | Abedini | H01Q 15/244 |
| 2024/0113772 A1* | 4/2024 | Abedini | H04W 24/08 |
| 2024/0323941 A1* | 9/2024 | Lyu | H04W 72/04 |
| 2024/0365425 A1* | 10/2024 | Yi | H04W 76/27 |

* cited by examiner

MEASUREMENT AND POWER CONTROL IN INTEGRATED ACCESS FRONTHAUL NETWORKS

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a base station includes determining a transmit power to be used by a downstream node or an amplification gain to be used by the downstream node when relaying or repeating messages to a target node; and transmitting, to the downstream node, a message intended for the target node, the message having an indicated transmit power, wherein the message intended for the target node is transmitted by the base station using an actual transmit power.

In an aspect, a method of wireless communication performed by a relay/repeater unit (RU) includes determining a transmit power or an amplification gain to be used for relaying or repeating messages to a downstream node; receiving, from an upstream node, a first message for the downstream node; and relaying or repeating the first message to the downstream node using the determined transmit power or the amplification gain.

In an aspect, a method of wireless communication performed by a user equipment (UE) includes receiving, from an upstream relay/repeater unit (RU), an indication of an amplification gain that will be used by the RU when relaying or repeating messages to the UE; receiving a plurality of messages from the RU, each message having an indicated power and a receive power; and estimating a channel between the UE and the RU based on the amplification gain and on the indicated power and the receive power of the plurality of messages from the RU.

In an aspect, a base station includes a memory; a communication interface; and at least one processor communicatively coupled to the memory and the communication interface, the at least one processor configured to: determine a transmit power to be used by a downstream node or an amplification gain to be used by the downstream node when relaying or repeating messages to a target node; and cause the communication interface to transmit, to the downstream node, a message intended for the target node, the message having an indicated transmit power, wherein the message intended for the target node is transmitted by the base station using an actual transmit power.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
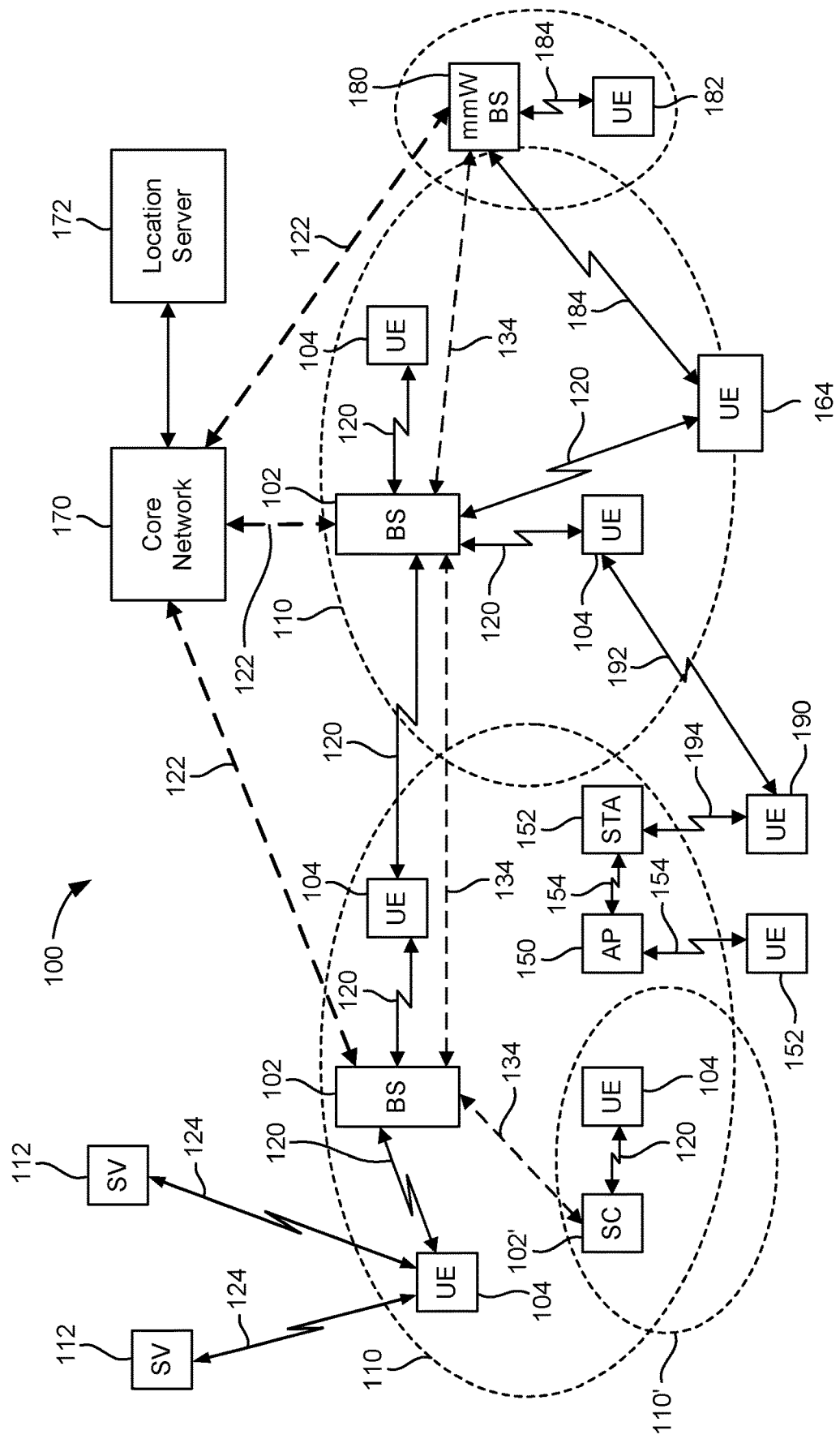
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
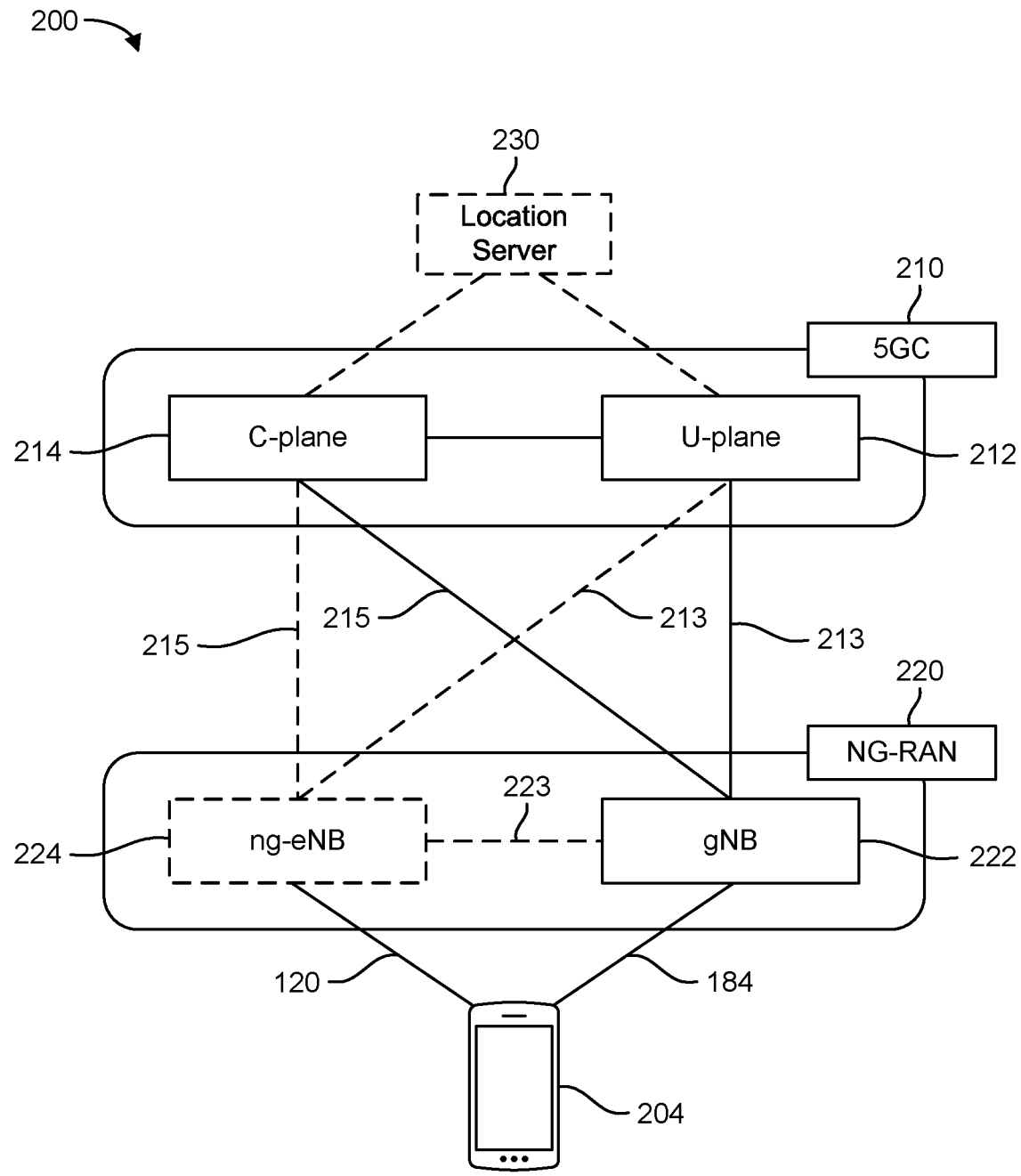
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
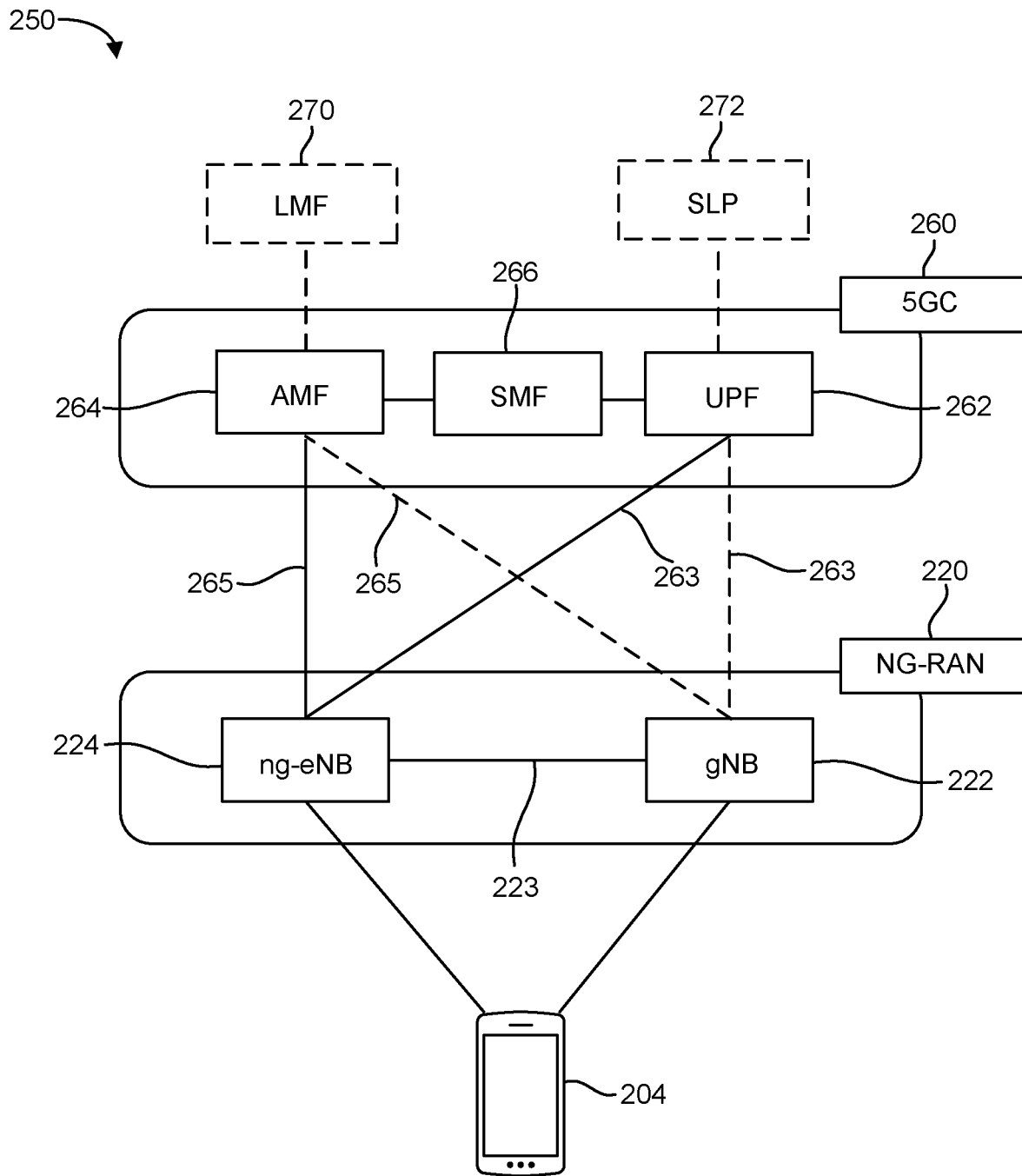

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the NG-RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the NG-RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and an LMF 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
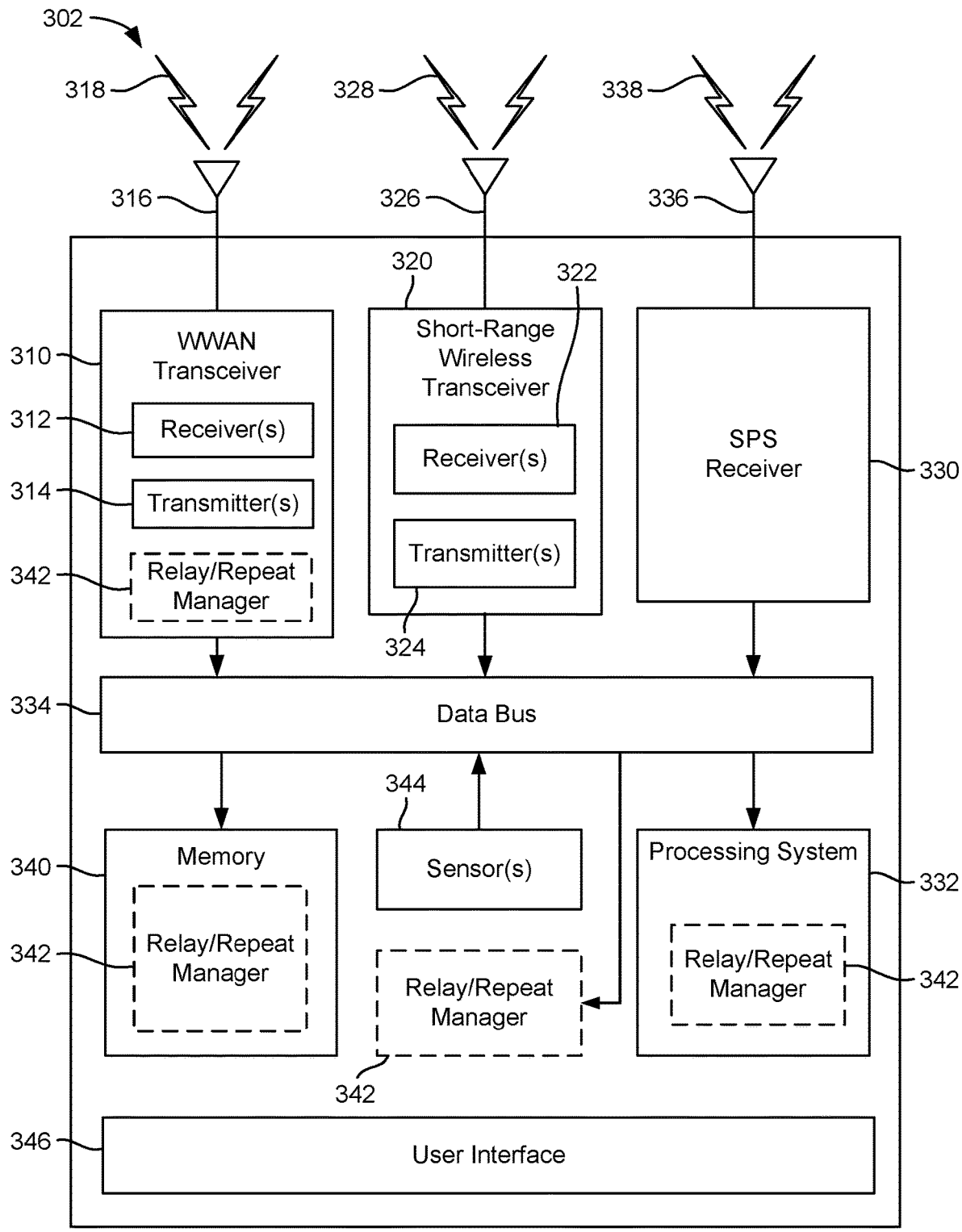
FIGS. 3A to 3C are simplified block diagrams of several sample aspects of components that may be employed in a user equipment (UE), a base station, and a network entity, respectively, and configured to support communications as taught herein.
Figure 3B:
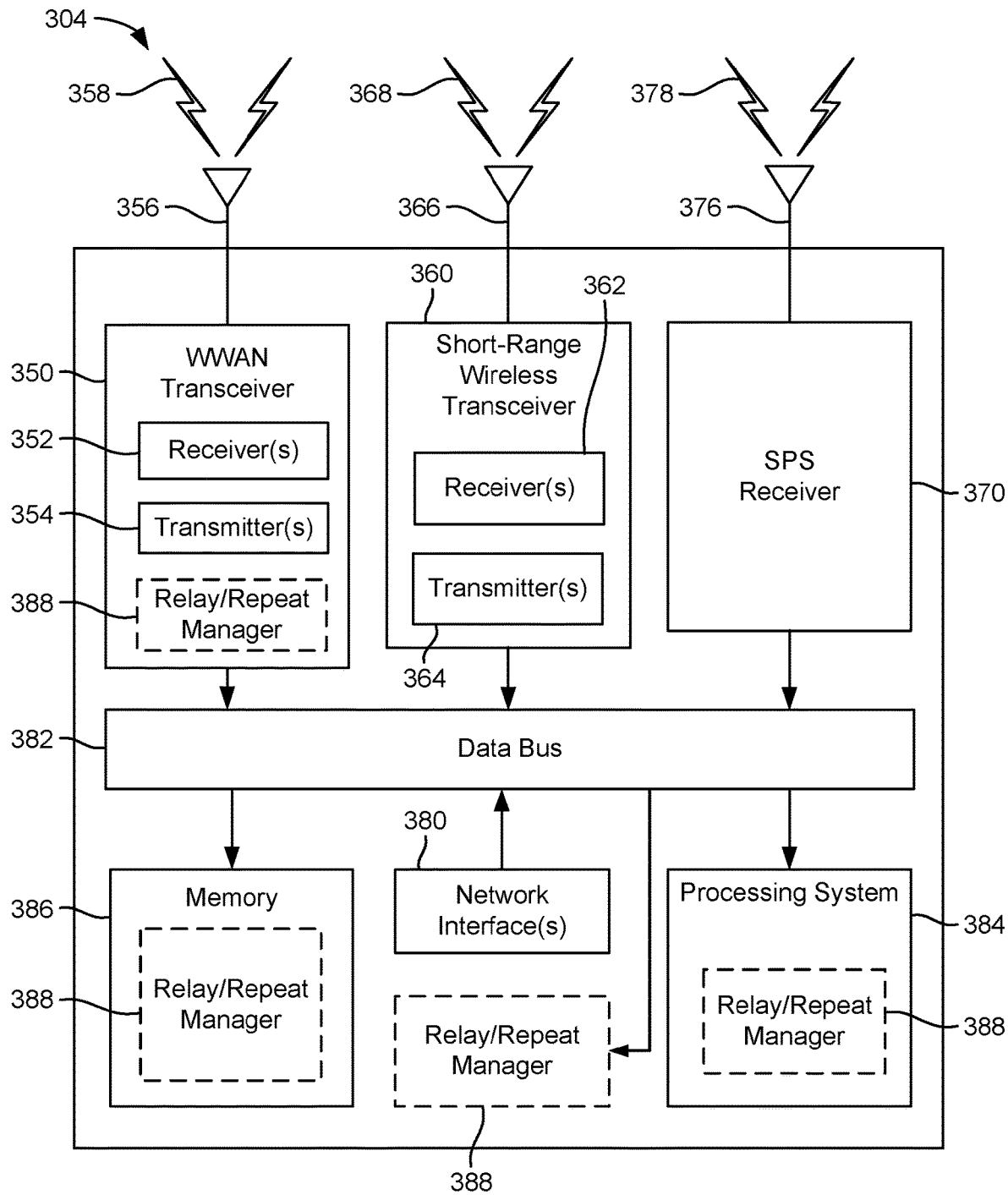
Figure 3C:
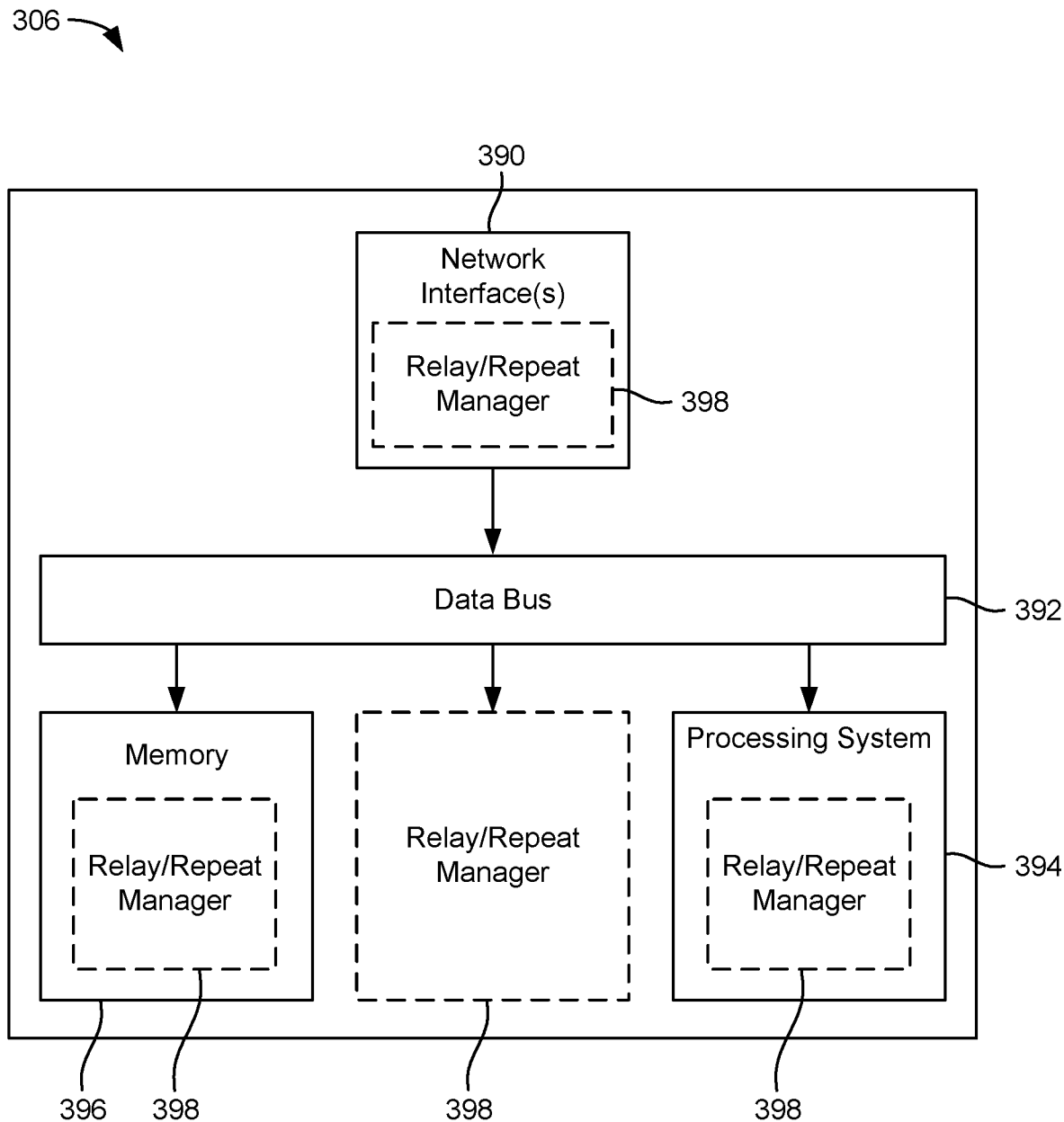

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include relay/repeat managers 342, 388, and 398, respectively. The relay/repeat managers 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the relay/repeat managers 342, 388, and 398 may be external to the processing systems 332, 384, and 394 (e.g., part of a modem processing system, integrated with another processing system, etc.). Alternatively, the relay/repeat managers 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the relay/repeat manager 342, which may be part of the WWAN transceiver 310, the memory component 340, the processing system 332, or any combination thereof, or may be a standalone component. FIG. 3B illustrates possible locations of the relay/repeat manager 388, which may be part of the WWAN transceiver 350, the memory component 386, the processing system 384, or any combination thereof, or may be a standalone component. FIG. 3C illustrates possible locations of the relay/repeat manager 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the relay/repeat managers 342, 388, and 398, etc.

FIGS. 4A-4D illustrate the differences between a repeater function and a relayer function, as well as some technical challenges faced by conventional repeater and relayer functions. As used herein, the generic term repeater/relayer unit (RU) is used to refer to a network node that performs a repeater function, a relayer function, or both. Where the RU does a particular function, e.g., repeater or relayer, that will be so indicated.

Figure 4A:
FIGS. 4A to 4D illustrate the differences between a repeater function and a relayer function.

FIG. 4A shows a repeater function, in which a repeater node receives a message X from a first node N1 and sends a message X' to a second node N2. A repeater essentially regenerates the signal X as X', e.g., by duplicating the tones of X. From the signal processing point of view, X and X' would look the same at the receiver N2.

In one example, N1 is a gNB and N2 is a UE, and the connection between gNB and RU is referred to as a fronthaul link while the connection between the RU and UE is referred to as an access link. Thus, the examples illustrated in FIGS. 4A-4D are referred to as integrated access fronthaul (IAF) networks.

In an access network (i.e., without a RU), the UE uses the transmit power of the gNB and estimated signal quality (e.g., RSRP) of the DL channel to set up the UL transmit power. The UE may presume that the advertised transmit power (included in the DL message) is the actual transmit power used by the gNB when it sent that DL message. The advertised transmit power may also be referred to herein as the indicated transmit power. Knowing the transmit power used by the gNB and the received power measured by the UE itself, the UE estimate a channel attribute such as pathloss.

In contrast, in an IAF where the RU is a repeater function, the UE only knows the transmit power of the gNB (from the message contents, e.g., the advertised transmit power) and does not know the transmit power of the repeater. This will be described in more detail below.

Figure 4B:
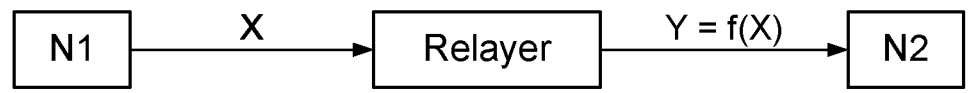
Figure 4C:
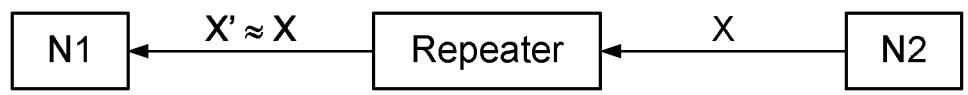
Figure 4D:

FIG. 4B shows a relayer function, in which a relayer mode receives a message X from the first node N1 and generates a new signal Y, which carries information about or from signal X. The relayer node does not replicate the tones of the original signal X, but instead contains essentially the same content as X but in a different form. To give a DL example, message X could be a front-haul physical downlink shared channel (FH-PDSCH) having a payload that carries some information (e.g., IQ samples), and Y could be a legacy PDSCH that is generated based upon that information. To give an UL example, message X could be a legacy PUSCH and message Y could be a FH-PUSCH having a payload that carries some information acquired from message X.

Figure 5:
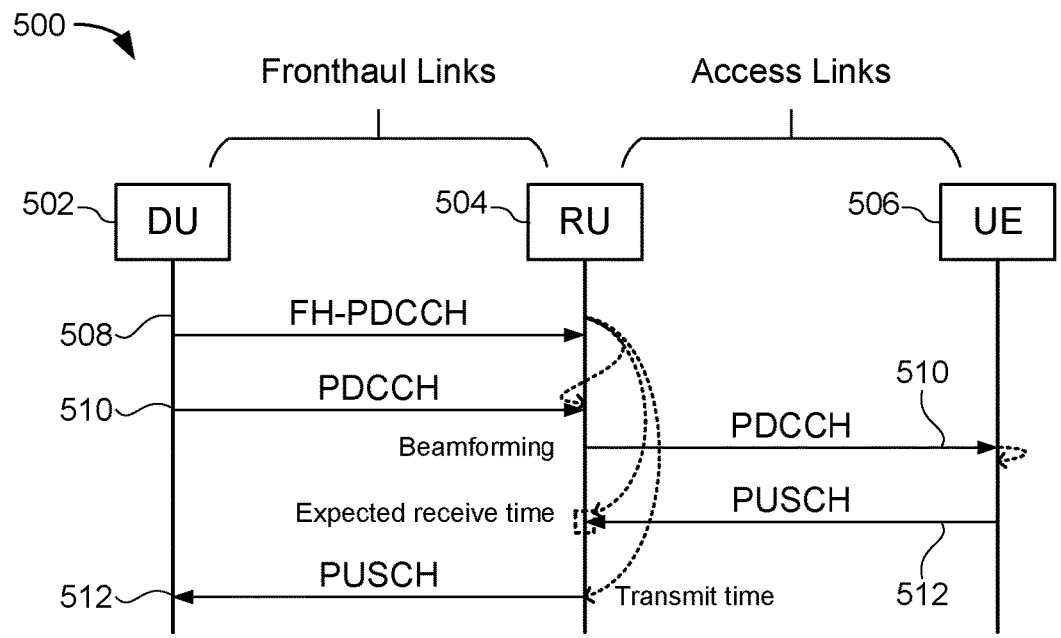
FIG. 5 illustrates a conventional repeating operation in more detail.

FIG. 5 illustrates a conventional repeating operation in more detail. In FIG. 5, in an integrated access fronthaul network 500, the links between a distributed unit (DU) 502 and a relay unit (RU) 504 are referred to as fronthaul links, and the links between the RU 504 and a UE 506 are referred to as access links. In this context, the path from the DU through one or more RUs to a UE is referred to as "downstream" and the path from the UE through one or more RUs to the DU is referred to as "upstream." Moreover, for any particular node, the upstream node may be referred to as that node's parent, and the downstream node may be referred to as that node's child, and any node can be both a parent to a downstream node and a child to an upstream node. For example, in FIG. 5, the DU 502 may be referred to as the parent of the child RU 504, the RU 504 may be referred to as the parent of the child UE 506, the DU 502 may be referred to as the grandparent of the UE 506, the UE 506 may be referred to as the grandchild of the DU 502, and so on. It is noted that these terms are for convenience, used to describe relationships between nodes, and are not limiting in any way.

In the example illustrated in FIG. 5, the DU 502 needs to configure the RU 504 to communicate with the UE 506, to the DU 502 sends a FH-PDCCH 508 to the RU 504. The FH-PDCCH defines the time domain (TD) and frequency domain (FD) resources to be used by the RU 504 to communicate with the UE 506, which may include beamforming configurations, expected receive times, transmit times, etc. The DU 502 then sends a PDCCH 510 to the RU 504, which forwards the PDCCH 510 to the UE 506. The PDCCH 510 schedules the UE 506 to transmit a PUSCH 512 to the RU 504, which relays the PUSCH 512 to the DU 502.

Figure 6:
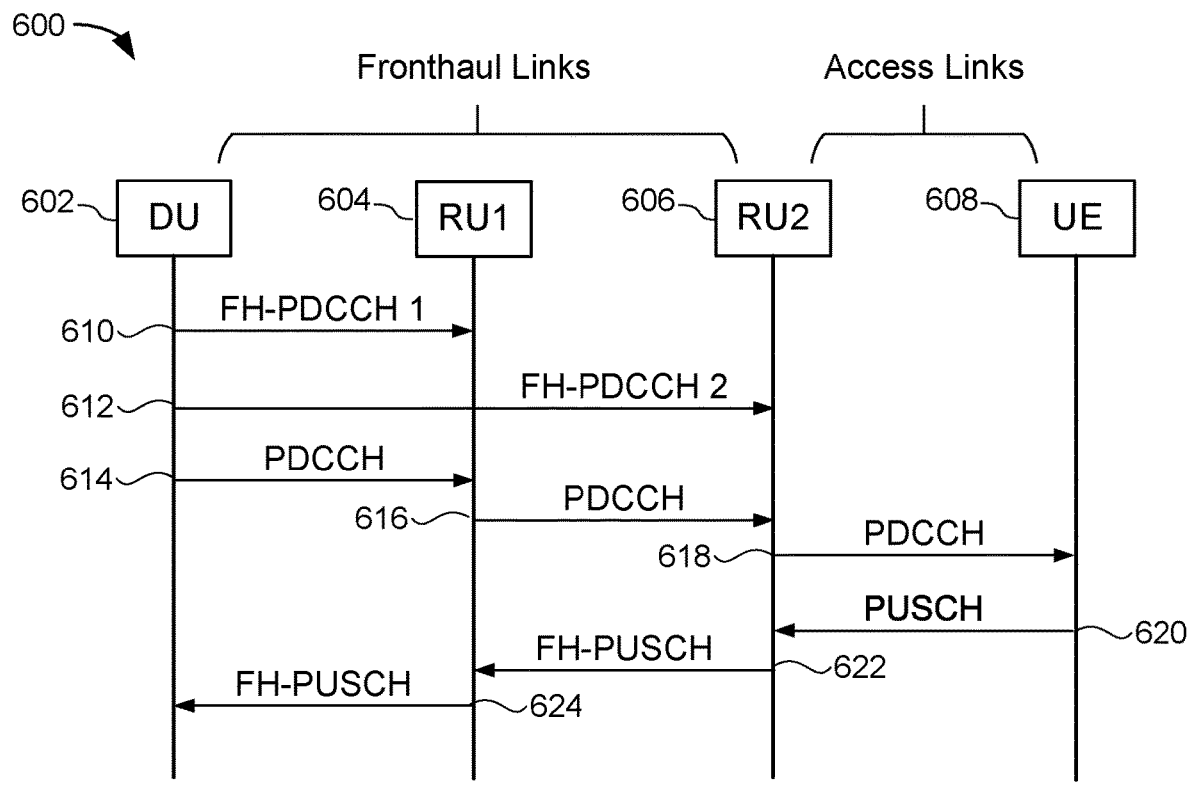
FIG. 6 illustrates a conventional multi-hop relaying/repeating operation in more detail.

FIG. 6 illustrates a conventional multi-hop relaying/repeating operation in more detail.

In FIG. 6, in an integrated access fronthaul network 600, a fronthaul network includes a DU 602, a first repeating unit RU1 604, a second repeating unit RU2 606, and an access network connects the RU2 606 to a UE 608. In the multi-hop example shown in FIG. 6, the DU 602 sends a first FH-PDCCH (FH-PDCCH1) 610 to the RU1 604 to configure it to communicate with the RU2 606, and the DU 602 sends a second FH-PDCCH (FH-PDCCH2) 612 to the RU2 606 to configure it to communicate with the UE 608. The DU 602 then sends a PDCCH 614 to the RU1 604. The RU1 604 relays the PDCCH 616 to the RU2 606. The RU2 606 relays the PDCCH 618 to the UE 608. The PDCCH 618 determines the timing of the PUSCH 620, which the UE 608 sends to the RU2 606. The RU2 606 relays the information in a FH-PUSCH 622 to the RU1 604, which forwards the FH-PUSCH 624 to the DU 602.

Figure 7:
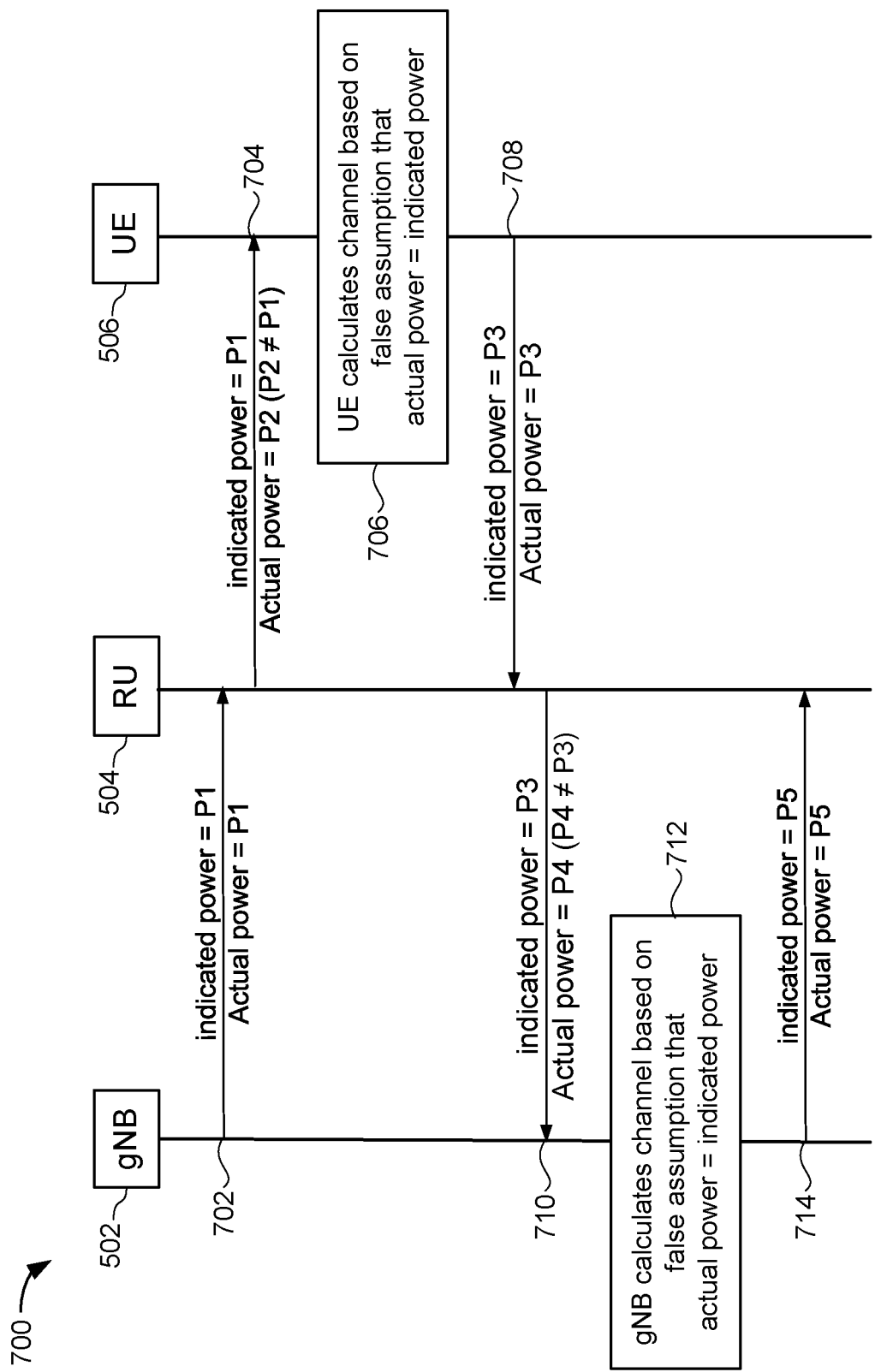
FIG. 7 illustrates a weakness of conventional relay/repeat methods.

FIG. 7 illustrates a weakness of conventional relay/repeat methods. In FIG. 7, a single-hop integrated access fronthaul network 700 includes a DU, e.g., gNB 502, an RU 504, and a UE 506. The DU 502 sends, to the RU 504, a DL message 702 (e.g., a PDCCH) with an actual transmit power, P1, that is the same as the advertised power. The RU 504 forwards the message 704 to the UE 506, but at a different power, P2. This may be because the UE is close to the RU but the RU is far from the gNB, in which case P2 will be less than P1. This may also be because the UE is far from the RU but the RU is close to the gNB, in which case P2 will be greater than P1. However, since the original message is unchanged by a repeater, the advertised power within the message will also be unchanged, with the result that the advertised power is not the actual power with which the RU 504 transmitted the message. A relayed message may also retain the original advertised power, which may not be the same as the actual power with which the RU 405 transmitted the message.

Because the UE 506 calculates a channel based at least on a comparison of the advertised transmit power and the received signal power, the discrepancy between the advertised transmit power and the actual transmit power may cause the UE 506 to mischaracterize the channel between itself and the RU 504. This is illustrated in the following examples, which use arbitrary values of 1-10 to represent transmit power levels from low to high.

In one example, the gNB 502 transmits the message 702 with power 5 (P1=7), and the RU 504 retransmits the message 704 with power 3 (P2=3), e.g., because the RU 504 is closer to the UE 506 than to the gNB 502. The UE 506 receives the message 704 with a receive power of 2. The actual channel path loss (receive power−transmit power)=2−3=−1, but at block 706 the UE 506 calculates the channel path loss as 2−7=−5. That is, the UE overestimates the path loss between itself and the RU 504, and in response, selects a transmit power that is higher than it needs to be for the message 708 to reach the RU 504, which can needlessly consume the UE's battery power.

In another example, the gNB 502 transmits the message 702 with power 5 (P1=5), and the RU 504 retransmits the message 704 with power 7 (P2=7), e.g., because the RU 504 is closer to the gNB 502 than to the UE 506. The UE 506 receives the message 704 with a receive power of 2. The actual channel path loss (receive power−transmit power)=2−7=−5, but at block 706 the UE 506 calculates the channel path loss as 2−5=−3. That is, the UE underestimates the path loss between itself and the RU 504, and in response, selects a transmit power that is lower than it needs to be for the message 708 to reach the RU 504. This may result in poor transmit quality, failure of the RU 504 to correctly receive and decode the message 708, multiple retransmissions due to a HARQ NACK, and other inefficiencies.

The same problem can occur in the other direction as well. In FIG. 7, the RU 504 receives, from the UE 506, an UL message 708 that was transmitted with an actual power, P3, that is the same as the advertised power. The RU 504 forwards the message 710 to the gNB 502, but at a different power, P4. At block 712, the gNB 502 calculates a channel based at least on a comparison of the advertised transmit power and the received signal power, but the discrepancy between the advertised transmit power and the actual transmit power may cause the gNB 502 to mischaracterize the channel between itself and the RU 504, in which case the power P5 selected for the transmission 714 may be incorrect.

To address these technical problems with existing networks, methods and systems for measurement and power control in integrated access fronthaul networks are herein provided. In order to avoid mischaracterization of a channel between an RU and an upstream or downstream node, a number of solutions are presented. In one approach, a UE is configured to retransmit with a fixed amplification gain instead of a fixed transmit power, which allows the receiving entities to calculate an effective advertised transmit power. In another approach, the RU may report, to the gNB, what the RU's transmit power to a UE will be, which allows the transmitting entities to calculate an adjusted transmit power value and use that value as the advertised transmit power.

Figure 8:
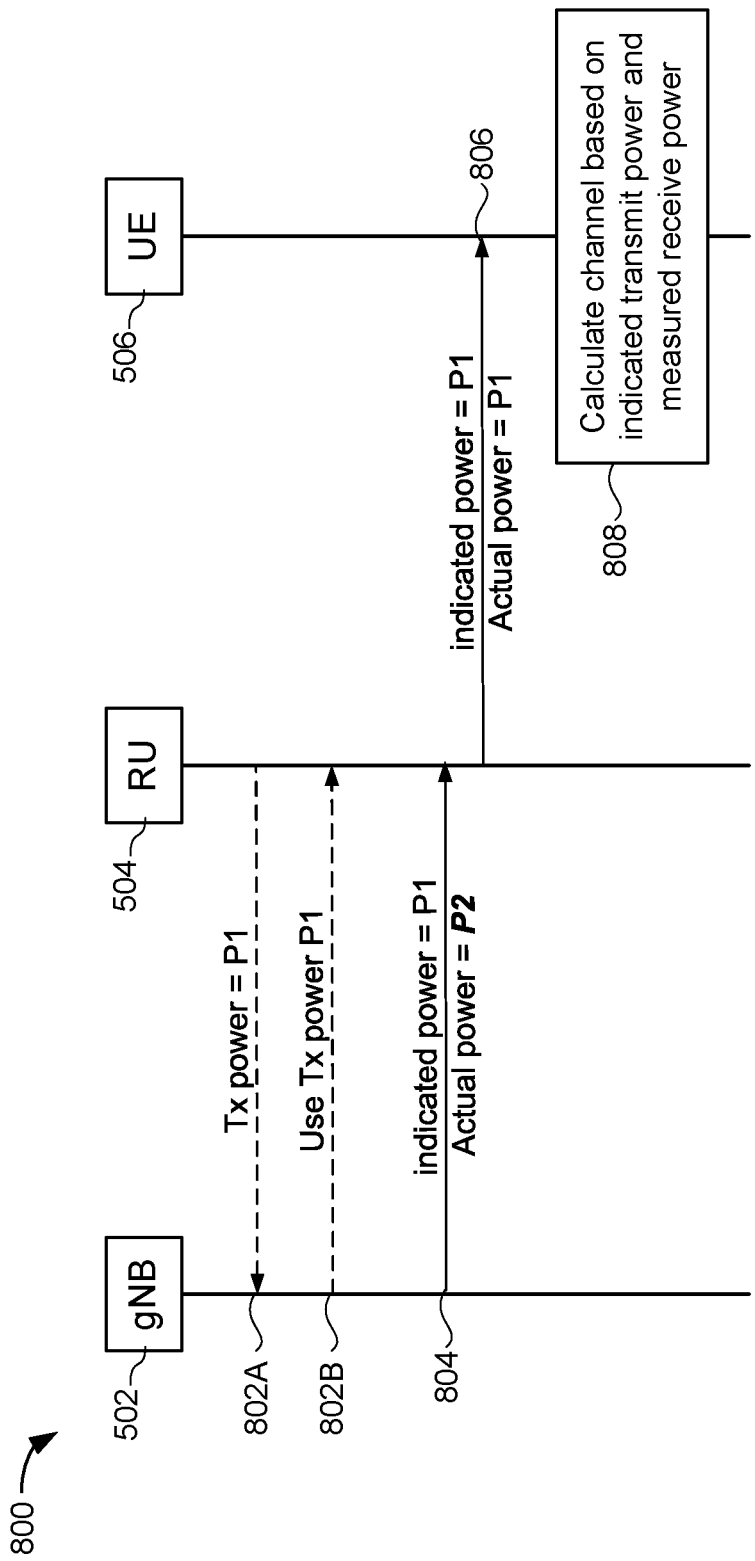
FIGS. 8 to 12 are flowcharts of example processes associated with measurement and power control in IAF networks according to some aspects of the present disclosure.

FIG. 8 is a flowchart of an example process 800 associated with measurement and power control in IAF networks according to some aspects of the present disclosure. In FIG. 8, an RU 504 is acting as a relay/repeater between a gNB 502 and a UE 506. In the example illustrated in FIG. 8, the gNB 502 may be one instance of device 304, the RU 504 may be another instance of device 304, and the UE may be an instance of device 302.

As shown in FIG. 8, the RU 504 may notify the gNB that it intends to use a transmit power P1 when transmitting to the UE 506 (block 802A). Means for performing the operation of block 802A may include the WWAN transceiver 350 of the RU 504. For example, the transmitter(s) 354 of the RU 504 may transmit a notification message and the receiver(s) 352 of the gNB 502 may receive the notification message. Alternatively, the gNB 502 may instruct the RU 504 to use the transmit power P1 when transmitting to the UE 506 (block 802B). Means for performing the operation of block 802A may include the WWAN transceiver 350 of the gNB 502. For example, the transmitter(s) 354 of the gNB 502 may transmit an instruction message and the receiver(s) 352 of the RU 504 may receive the instruction message.

As further shown in FIG. 8, the gNB 502 may then transmit, to the RU 504, a message for the UE 506 (block 804). Means for performing the operation of block 804 may include the WWAN transceiver 350 and the processing system 384 of the gNB 502. For example, the transmitter(s) 354 of the gNB 502 may transmit the message to the RU 504. In some aspects, the gNB 502 will transmit, to the RU 504, a message generated by the processing system 384 and advertising a transmit power P1, but using a transmit power P2 specified by the processing system 384.

As further shown in FIG. 8, the RU 504 may then relay or repeat the message to the UE 506 (block 806) using a transmit power P1, which matches the advertised power P1. Means for performing the operation of block 806 may include the WWAN transceiver of the RU 504. For example, the transmitter(s) 354 of the RU 504 may relay or repeat the message to the UE 506.

As further shown in FIG. 8, the UE 506 may then correctly estimate the channel between itself and the RU 504 based on the advertised transmit power and the received power (block 808). Means for performing the operation of block 808 may include the WWAN transceiver 310 and the processing system 332 of the UE 506. For example, the receiver(s) 312 may receive the message and the processing system 332 may calculate the estimated channel based on the advertised transmit power and the measured received power. Because the gNB 502 set the advertised power to match the transmit power that the RU 504 intended to use when relaying or repeating the message to the UE 506, the message received by the UE 506 has an advertised transmit power that matches the actual transmit power, and the estimate of the channel between the RU 504 and the UE 506, calculated during block 808, will be correct.

Figure 9:
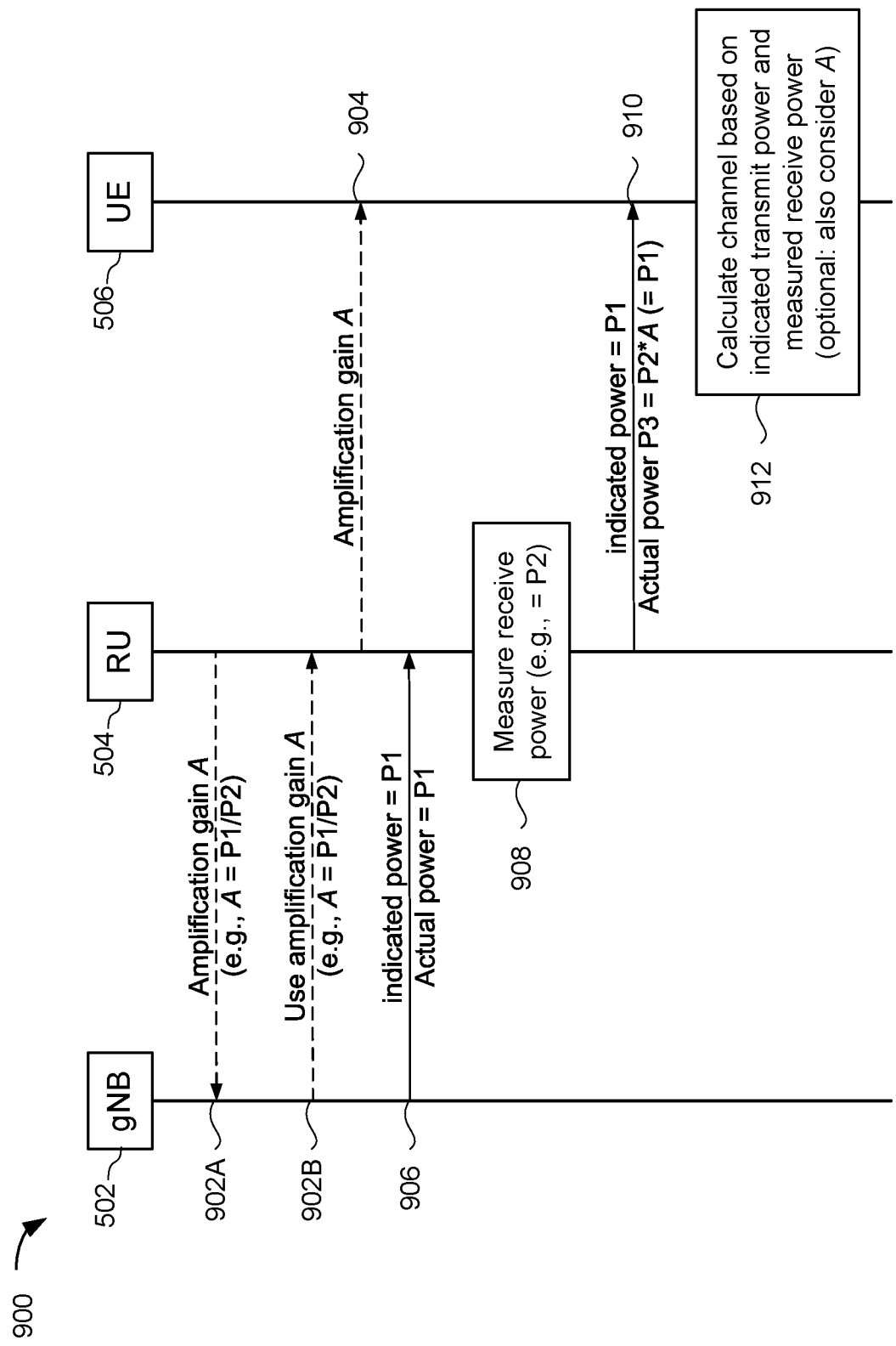

FIG. 9 is a flowchart of an example process 900 associated with measurement and power control in IAF networks according to some aspects of the present disclosure. In FIG. 9, an RU 504 is acting as a relay/repeater between a gNB 502 and a UE 506. In the example illustrated in FIG. 9, the gNB 502 may be one instance of device 304, the RU 504 may be another instance of device 304, and the UE may be an instance of device 302.

As shown in FIG. 9, the RU 504 may notify the gNB 502 of a particular amplification gain A that the RU 504 plans to use when relaying or repeating messages (optional block 902A). Alternatively, the gNB may instruct the RU 504 to use a particular amplification gain A when relaying or repeating messages from the gNB 502 to the UE 506 (optional block 902B). Means for performing the operation of block 902A or block 902B may include the WWAN transceiver 350 and the processing system 384 of the gNB 502. For example, the receiver(s) 352 of the gNB 502 may receive the indication of the value of A from the RU 504, or the transmitter(s) 354 of the gNB 502 may transmit the instruction message to the RU 504. In some aspects, a value of A is selected by the processing system 384 to compensate for the pathloss between the gNB 502 and the RU 504, but in other aspects, other values of A may be selected, or for other reasons.

As further shown in FIG. 9, the RU 504 may optionally send, to the UE 506, a notification of the amplification gain A that the RU 504 will be employing to relay or repeat messages to the UE 506 (block 904). Means for performing the operation of block 904 may include the WWAN transceiver 350 of the RU 504. For example, the transmitter(s) 354 of the RU 504 may transmit the message to the UE 506.

As further shown in FIG. 9, the gNB 502 may send, to the RU 504, a message intended for the UE 506 (block 906), using a transmit power P1, which is the same as the advertised power. Means for performing the operation of block 906 may include the WWAN transceiver 350 of the gNB 502. For example, the transmitter(s) 354 of the gNB 502 may transmit the message intended for the UE 506.

As further shown in FIG. 9, the RU 504 may receive the message and measure the received power P2 (block 908). Means for performing the operation of block 908 may include the WWAN transceiver 350 and the processing system 384 of the RU 504. For example, the receiver(s) 352 may receive the message and measure the power as instructed by the processing system 384.

As further shown in FIG. 9, the RU 504 may then relay or repeat the message (block 910) using a transmit power P3 that is calculated by applying the amplification gain A to the received power P2 (e.g., P3=P2*A). Means for performing the operation of block 910 may include the WWAN transceiver 350 and the processing system 384 of the RU 504. For example, the processing system 384 may calculate the value of P3 and instruct the transmitter(s) 354 to relay or repeat the message at that power. In one aspect, if the gain A is set to the ratio of P1/P2, the transmit power P3=P2*P1/P2=P1, which matches the advertised power P1, so that when the UE 506 estimates the channel between itself and the RU 504 based on the advertised transmit power and the received power, that estimated channel between the RU 504 and the UE 506 will be correct. In another aspect, the UE 506 may be informed of the amplification gain A used by the RU 504, and the UE 506 may use this information to calculate an effective or adjusted advertised power P1', which the UE 506 can use, along with the received power, to calculate the channel.

As further shown in FIG. 9, the UE 506 may then calculate a channel based on the advertised transmit power and the measured receive power (block 912). Means for performing the operation of block 912 may include the WWAN transceiver 310 and the processing system 332 of the UE 506. For example, the receiver(s) 312 may receive the message and the processing system 332 may estimate the channel between the RU 504 and the UE 506 based on the advertised transmit power and the measured receive power. In some aspects, where the UE 506 also knows the amplification gain A used by the RU 504, the UE 506 may also take that into consideration when estimating the channel between the RU 504 and the UE 506.

Figure 10:
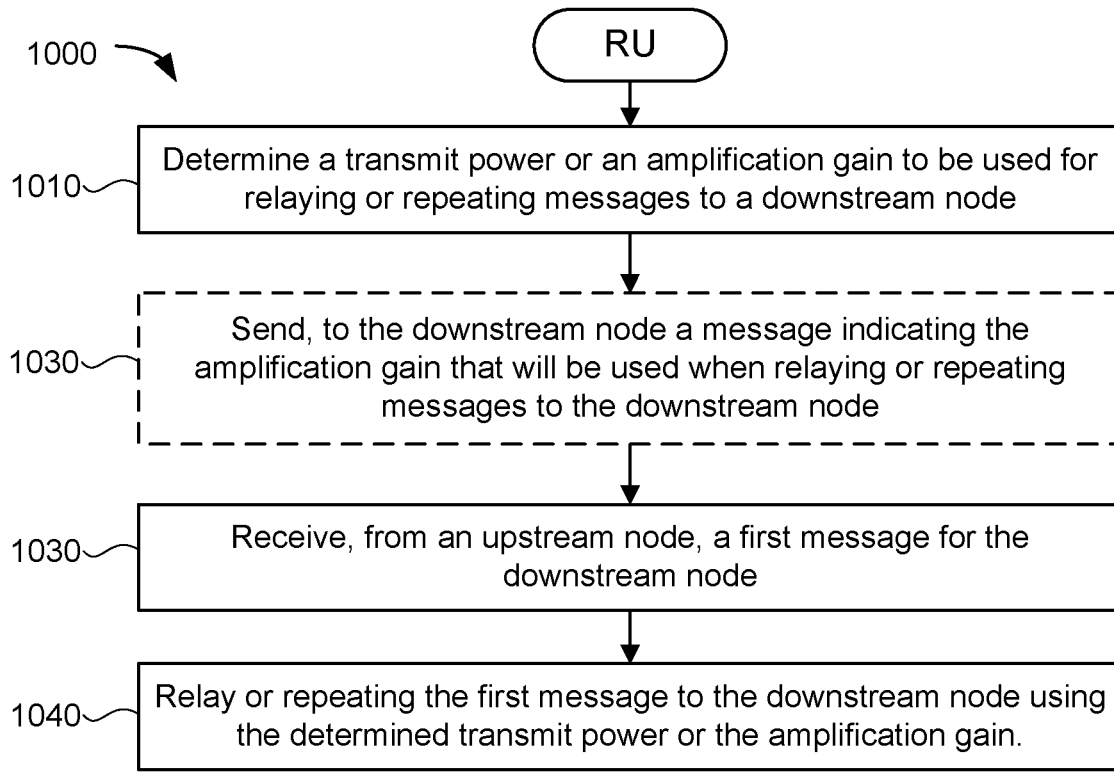

FIG. 10 is a flowchart of an example process 1000 associated with measurement and power control in integrated access fronthaul networks according to some aspects of the present disclosure. In some implementations, one or more process blocks of FIG. 10 may be performed by a base station (e.g., BS 102, gNB 502). In some implementations, one or more process blocks of FIG. 10 may be performed by another device or a group of devices separate from or including the BS. Additionally, or alternatively, one or more process blocks of FIG. 10 may be performed by one or more components of device 304, such as processing system 320, memory 386, WWAN transceiver 350, short-range wireless transceiver 360, SPS receiver 370, network interface 380, and/or relay/repeat manager(s) 388, any or all of which may be means for performing this process. For the flowchart illustrated in FIG. 10, the gNB 502 may be an instance of device 304.

As shown in FIG. 10, process 1000 may include determining a transmit power P1 to be used by a downstream node or an amplification gain A to be used by the downstream mode when relaying or repeating messages to a target node (block 1010). Means for performing the operation of block 1010 may include the WWAN transceiver 350 of the gNB 502. In some aspects, determining a value for P1 or A may comprise sending, to a downstream node, an indication of a value for P1 or a value for A. For example, the gNB 502 may send the first message to the RU 504 via transmitter(s) 354 of the gNB 502. In some aspects, the gNB 502 receives, from the downstream node, an indication of the value of P1 or the value of A.

As further shown in FIG. 10, process 1000 may include transmitting, to the downstream node, a message intended for the target node, the message having an advertised transmit power P1 and having an actual transmit power P2 (block 1020). Means for performing the operation of block 1020 may include the WWAN transceiver 350 of the gNB 502. For example, the gNB 502 may send the message to the RU 504 via transmitter(s) 354 of the gNB 502.

In some aspects, the transmit power to be used by the downstream node is determined, in which case the advertised transmit power may be set to a value indicating the transmit power to be used by the downstream mode (e.g., the RU 504) to relay or repeat the message to the UE 506 rather than a value indicating the transmit power that was used by the gNB 502 when it sent the message to the RU 504. In these aspects, the advertised transmit power and the actual transmit power may not be the same.

In some aspects, the amplification gain to be used by the downstream node is determined, in which case the advertised transmit power may be set to a value indicating the transmit power that was used by the gNB 502 when it sent the message to the RU 504. In these aspects, the advertised transmit power and the actual transmit power are the same.

In some aspects, the message comprises a physical downlink control channel (PDCCH) message.

Process 1000 may include additional implementations, such as any single implementation or any combination of implementations described below and/or in connection with one or more other processes described elsewhere herein. Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
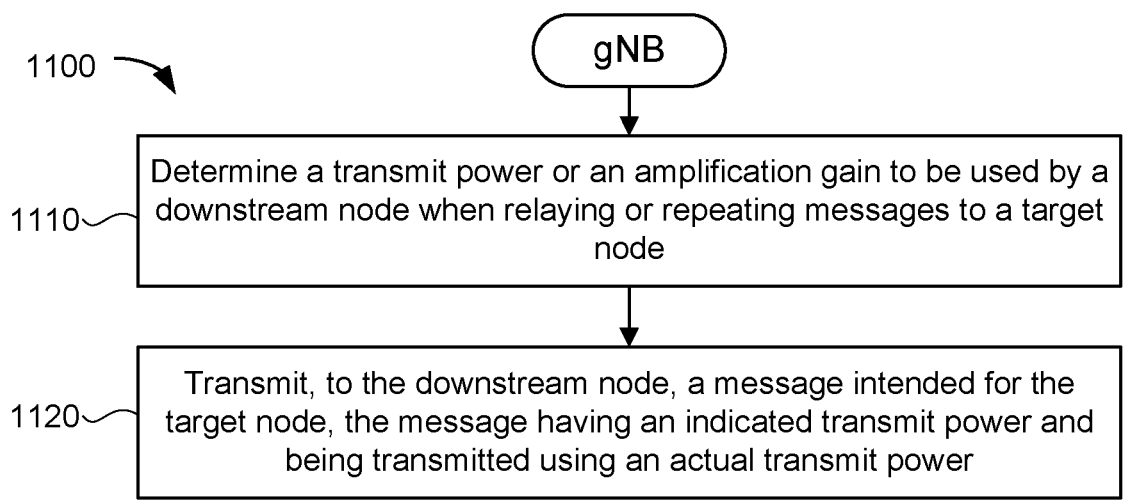

FIG. 11 is a flowchart of an example process 1100 associated with measurement and power control in integrated access fronthaul networks according to some aspects of the present disclosure. In some implementations, one or more process blocks of FIG. 11 may be performed by an RU (e.g., RU 504, RU 604). In some implementations, one or more process blocks of FIG. 11 may be performed by another device or a group of devices separate from or including the RU. Additionally, or alternatively, one or more process blocks of FIG. 11 may be performed by one or more components of device 304, such as processing system 320, memory 386, WWAN transceiver 350, short-range wireless transceiver 360, SPS receiver 370, network interface 380, and/or relay/repeat manager(s) 388, any or all of which may be means for performing this process. For the flowchart illustrated in FIG. 11, the RU 504 may be an instance of device 304.

As shown in FIG. 11, process 1100 may include determining a transmit power P1 or an amplification gain A to be used for relaying or repeating messages to a downstream node (block 1110). Means for performing the operation of block 1110 may include processing system 384 of the RU 504. For example, the processing system 384 may determine a transmit power P1 or an amplification gain A to be used for relaying or repeating messages to a downstream node, as described above. In some aspects, determining a transmit power P1 or an amplification gain A comprises receiving, from an upstream node, a message indicating the transmit power P1 to be used for relaying or repeating messages to the downstream node. In some aspects, determining a transmit power P1 or an amplification gain A comprises receiving, from an upstream node, a message indicating an amplification gain A to be used for relaying or repeating messages to the downstream node. In some aspects, determining a transmit power P1 or an amplification gain A comprises selecting the transmit power P1 to be used for relaying or repeating messages, and sending, to an upstream node, a message indicating the transmit power P1. In some aspects, determining a transmit power P1 or an amplification gain A comprises selecting the amplification gain A to be used for relaying or repeating messages, and sending, to an upstream node, a message indicating the amplification gain A.

As further shown in FIG. 11, process 1100 may optionally include sending, to the downstream node, a message indicating the amplification gain A that the RU will be using when relaying or repeating messages to the downstream node (optional block 1120). Means for performing the operation of block 1120 may include the WWAN transceiver 350 of the RU 504. For example, the RU 504 may transmit this message to the downstream UE 506 via transmitter(s) 354 of the RU 504.

As further shown in FIG. 11, process 1100 may include receiving, from an upstream node, a first message for the downstream node (block 1130). Means for performing the operation of block 1130 may include the WWAN transceiver 350 of the RU 504. For example, the receiver(s) 352 may receive, from a gNB 502, the first message for a downstream UE 506. In some aspects, the first message comprises a physical downlink control channel (PDCCH) message. In some aspects, receiving the first message from the upstream node comprises receiving the first message from a base station or from another RU.

As further shown in FIG. 11, process 1100 may include relaying or repeating the first message to the downstream node using the determined transmit power P1 or the amplification gain A (block 1140). Means for performing the operation of block 1140 may include the WWAN transceiver 350 and the processing system 384 of the RU 504. For example, the processing system 384 may configure the transmitter(s) 354 to relay or repeat the first message to the downstream node using the determined transmit power P1 or the amplification gain A, as described above. In some aspects, relaying or repeating the first message to the downstream node comprises relaying or repeating the first message to a user equipment (UE) or to another RU.

Process 1100 may include additional implementations, such as any single implementation or any combination of implementations described below and/or in connection with one or more other processes described elsewhere herein. Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
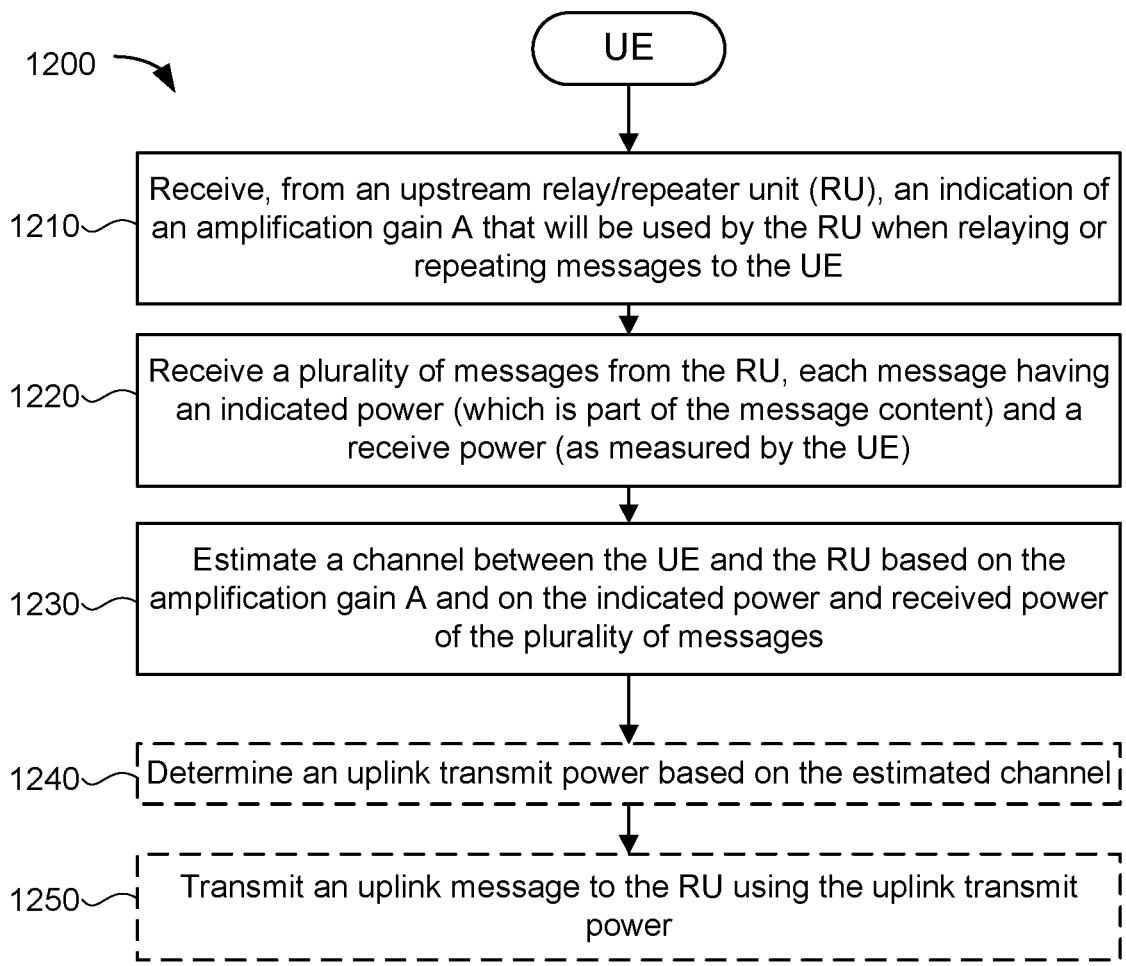

FIG. 12 is a flowchart of an example process 1200 associated with measurement and power control in integrated access fronthaul networks according to some aspects of the present disclosure. In some implementations, one or more process blocks of FIG. 12 may be performed by a UE (e.g., UE 104, UE 506). In some implementations, one or more process blocks of FIG. 12 may be performed by another device or a group of devices separate from or including the UE. Additionally, or alternatively, one or more process blocks of FIG. 12 may be performed by one or more components of device 302, such as processing system 332, memory 340, WWAN transceiver 310, short-range wireless transceiver 320, SPS receiver 330, relay/repeat manager(s) 342, and/or user interface 346, any or all of which may be means for performing this process. For the flowchart illustrated in FIG. 12, the UE 506 may be an instance of device 302.

As shown in FIG. 12, process 1200 may include receiving, from an upstream RU, an indication of an amplification gain A that will be used by the RU when relaying or repeating messages to the UE (block 1210). Means for performing the operation of block 1210 may include the WWAN transceiver 310 of the UE 506. For example, the UE 506 may receive the indication via the receiver(s) 312 of the UE 506.

As further shown in FIG. 12, process 1200 may include receiving, from the RU, at least one message having an advertised power and a receive power (block 1220). Means for performing the operation of block 1220 may include the WWAN transceiver 310 of the UE 506. For example, the UE 506 may receive the messages via the receiver(s) 312 of the UE 506. In some aspects, at least one of the received message comprises a physical downlink control channel (PDCCH) message.

As further shown in FIG. 12, process 1200 may include estimating a channel between the UE and the RU based on the amplification gain A and based on the advertised power and the received power values for the received messages (block 1230). Means for performing the operation of block 1230 may include various components of the UE 506. For example, the processing system 332 of the UE 506 may estimate a channel between the UE and the RU based on the advertised power P1, which the WWAN transceiver 310 or the processing system 332 extracted from the second message, the receive power P3, which the WWAN transceiver 310 measures and reports to the processing system 332, and the amplification gain A, which the processing system 332 extracted from the first message and stored in the memory 340. In some aspects, the UE 506 may solve a set of algebraic equations in two variables corresponding to the pathloss between the gNB 502 and the RU 504 and the pathloss between the RU 504 and the UE 506, using the values for advertised power and received power from the received messages.

As further shown in FIG. 12, process 1200 may include determining an uplink transmit power based on the estimated channel (block 1240). Means for performing the operation of block 1240 may include the processing system 332 and the memory 340 of the UE 506. For example, the processing system 332 of the UE 506 may use a lookup table stored in the memory 340 to determine the uplink transmit power to use based on estimated channel attributes such as pathloss, etc.

As further shown in FIG. 12, process 1200 may include transmitting an uplink message to the RU using the uplink transmit power (block 1250). Means for performing the operation of block 1250 may include the WWAN transceiver 310 of the UE 506. For example, the transmitter(s) 314 may transmit the uplink message to the RU 504, where the transmitter(s) 314 use the uplink transmit power calculated in block 1240.

Process 1200 may include additional implementations, such as any single implementation or any combination of implementations described below and/or in connection with one or more other processes described elsewhere herein. Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel.

In an aspect, a relay/repeater unit (RU) includes a memory; a communication interface; and at least one processor communicatively coupled to the memory and the communication interface, the at least one processor configured to: determine a transmit power P1 or an amplification gain A to be used for relaying or repeating messages to a downstream node; receive, via the communication interface, from an upstream node, a first message for the downstream node; and relay or repeating the first message to the downstream node using the determined transmit power P1 or the amplification gain A.

In some aspects, the at least one processor being configured to determine the transmit power P1 or the amplification gain A comprises the at least one processor being configured to receive, from the upstream node, an indication of the transmit power P1 to be used for relaying or repeating messages to the downstream node.

In some aspects, the at least one processor being configured to determine the transmit power P1 or the amplification gain A comprises the at least one processor being configured to receive, from the upstream node, an indication of an amplification gain A to be used for relaying or repeating messages to the downstream node.

In some aspects, the at least one processor being configured to determine the transmit power P1 or the amplification gain A comprises the at least one processor being configured to select the transmit power P1 to be used for relaying or repeating messages, and sending, to the upstream node, an indication of the transmit power P1.

In some aspects, the at least one processor being configured to determine the transmit power P1 or the amplification gain A comprises the at least one processor being configured to select the amplification gain A to be used for relaying or repeating messages, and sending, to the upstream node, an indication of the amplification gain A.

In some aspects, the at least one processor is further configured to cause the communication interface to send, to the downstream node, an indication of the amplification gain A that the RU will be using when relaying or repeating messages to the downstream node.

In some aspects, the first message comprises a physical downlink control channel (PDCCH) message.

In some aspects, the at least one processor being configured to receive the first message from the upstream node comprises the at least one processor being configured to receive the first message from a base station or from another RU.

In some aspects, the at least one processor being configured to relay or repeating the first message to the downstream node comprises the at least one processor being configured to relay or repeating the first message to a user equipment (UE) or to another RU.

In an aspect, a user equipment (UE) includes a memory; a communication interface; and at least one processor communicatively coupled to the memory and the communication interface, the at least one processor configured to: receive, via the communication interface, from an upstream relay/repeater unit (RU), a first message indicating an amplification gain A that will be used by the RU when relaying or repeating messages to the UE; receive, via the communication interface, from the RU, a second message having an advertised power P1 and an actual power P2, the second message having a receive power P3; and estimate a channel between the UE and the RU based on the advertised power P1, the receive power P3, and the amplification gain A.

In some aspects, the second message comprises a physical downlink control channel (PDCCH) message.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a base station, the method comprising: determining a transmit power to be used by a downstream node or an amplification gain to be used by the downstream node when relaying or repeating messages to a target node; and transmitting, to the downstream node, a message intended for the target node, the message having an advertised transmit power, wherein the message intended for the target node is transmitted by the base station using an actual transmit power.

Clause 2. The method of clause 1, wherein determining the transmit power to be used by the downstream node or the amplification gain to be used by the downstream node comprises sending, to the downstream node, an indication of the transmit power to be used by the downstream node or the amplification gain to be used by the downstream node.

Clause 3. The method of any of clauses 1 to 2, wherein determining the transmit power to be used by the downstream node or the amplification gain to be used by the downstream node comprises receiving, from the downstream node, an indication of the transmit power to be used by the downstream node or the amplification gain to be used by the downstream node.

Clause 4. The method of any of clauses 1 to 3, wherein determining the transmit power to be used by the downstream node or the amplification gain to be used by the downstream node comprises determining the transmit power to be used by the downstream node.

Clause 5. The method of clause 4, wherein the advertised transmit power of the message intended for the target node is set to the value of the transmit power to be used by the downstream node.

Clause 6. The method of any of clauses 1 to 5, wherein determining the transmit power to be used by the downstream node or the amplification gain to be used by the downstream node comprises determining the amplification gain to be used by the downstream node.

Clause 7. The method of clause 6, wherein the advertised transmit power of the message intended for the target node is set to the value of the actual transmit power used by the base station to transmit the message intended for the target node.

Clause 8. The method of any of clauses 1 to 7, wherein the message intended for the target node comprises a physical downlink control channel (PDCCH) message.

Clause 9. A method of wireless communication performed by a relay/repeater unit (RU), the method comprising: determining a transmit power or an amplification gain to be used for relaying or repeating messages to a downstream node; receiving, from an upstream node, a first message for the downstream node; and relaying or repeating the first message to the downstream node using the determined transmit power or the amplification gain.

Clause 10. The method of clause 9, wherein determining the transmit power or the amplification gain comprises receiving, from the upstream node, an indication of the transmit power to be used for relaying or repeating messages to the downstream node.

Clause 11. The method of any of clauses 9 to 10, wherein determining the transmit power or the amplification gain comprises receiving, from the upstream node, an indication of an amplification gain to be used for relaying or repeating messages to the downstream node.

Clause 12. The method of any of clauses 9 to 11, wherein determining the transmit power or the amplification gain comprises selecting the transmit power to be used for relaying or repeating messages, and sending, to the upstream node, an indication of the transmit power.

Clause 13. The method of any of clauses 9 to 12, wherein determining the transmit power or the amplification gain comprises selecting the amplification gain to be used for relaying or repeating messages, and sending, to the upstream node, an indication of the amplification gain.

Clause 14. The method of clause 13, further comprising sending, to the downstream node, an indication of the amplification gain that the RU will be using when relaying or repeating messages to the downstream node.

Clause 15. The method of any of clauses 9 to 14, wherein the first message comprises a physical downlink control channel (PDCCH) message.

Clause 16. The method of any of clauses 9 to 15, wherein receiving the first message from the upstream node comprises receiving the first message from a base station or from another RU.

Clause 17. The method of any of clauses 9 to 16, wherein relaying or repeating the first message to the downstream node comprises relaying or repeating the first message to a user equipment (UE) or to another RU.

Clause 18. A method of wireless communication performed by a user equipment (UE), the method comprising: receiving, from an upstream relay/repeater unit (RU), an indication of an amplification gain that will be used by the RU when relaying or repeating messages to the UE; receiving a plurality of messages from the RU, each message having an advertised power and a receive power; and estimating a channel between the UE and the RU based on the amplification gain and on the advertised power and the receive power of the plurality of messages from the RU.

Clause 19. The method of clause 18, further comprising determining an uplink transmit power based on the estimated channel.

Clause 20. The method of clause 19, further comprising transmitting an uplink message to the RU using the uplink transmit power.

Clause 21. The method of any of clauses 18 to 20, wherein at least one of the plurality of messages from the RU comprises a physical downlink control channel (PDCCH) message.

Clause 22. An apparatus comprising a memory, a communication interface, and at least one processor communicatively coupled to the memory and the communication interface, the memory, the communication interface, and the at least one processor configured to perform a method according to any of clauses 1 to 21.

Clause 23. An apparatus comprising means for performing a method according to any of clauses 1 to 21.

Clause 24. A non-transitory computer-readable medium storing computer-executable instructions, the computer-executable comprising at least one instruction for causing a computer or processor to perform a method according to any of clauses 1 to 21.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), the method comprising:
    receiving, from an upstream relay/repeater unit (RU), an indication of an amplification gain that will be used by the RU when relaying or repeating messages to the UE;
    receiving a plurality of messages from the RU, each message having an indicated power and a receive power; and
    estimating a channel between the UE and the RU based on the amplification gain and on the indicated power and the receive power of the plurality of messages from the RU.

2. The method of claim 1, further comprising determining an uplink transmit power based on the estimated channel.

3. The method of claim 2, further comprising transmitting an uplink message to the RU using the uplink transmit power.

4. The method of claim 1, wherein at least one of the plurality of messages from the RU comprises a physical downlink control channel (PDCCH) message.

5. A user equipment (UE) comprising:
    a processing system configured to:
        receive, from an upstream relay/repeater unit (RU), an indication of an amplification gain that will be used by the RU when relaying or repeating messages to the UE;
        receive a plurality of messages from the RU, each message having an indicated power and a receive power; and
        estimate a channel between the UE and the RU based on the amplification gain and on the indicated power and the receive power of the plurality of messages from the RU.

6. The UE of claim 5, wherein the processing system is configured to determine an uplink transmit power based on the estimated channel.

7. The UE of claim 6, wherein the processing system is configured to transmit an uplink message to the RU using the uplink transmit power.

8. The UE of claim 5, wherein at least one of the plurality of messages from the RU comprises a physical downlink control channel (PDCCH) message.

9. A non-transitory computer-readable medium having code stored thereon that, when executed by an apparatus, causes the apparatus to:

receive, from an upstream relay/repeater unit (RU), an indication of an amplification gain that will be used by the RU when relaying or repeating messages to the apparatus;

receive a plurality of messages from the RU, each message having an indicated power and a receive power; and estimate a channel between the apparatus and the RU based on the amplification gain and on the indicated power and the receive power of the plurality of messages from the RU.

10. The non-transitory computer-readable medium of claim 9, wherein the code, when executed by the apparatus, causes the apparatus to determine an uplink transmit power based on the estimated channel.

11. The non-transitory computer-readable medium of claim 10, wherein the code, when executed by the apparatus, causes the apparatus to transmit an uplink message to the RU using the uplink transmit power.

12. The non-transitory computer-readable medium of claim 9, wherein at least one of the plurality of messages from the RU comprises a physical downlink control channel (PDCCH) message.

\* \* \* \* \*